US006833524B2

(12) United States Patent
Krenz

(10) Patent No.: US 6,833,524 B2
(45) Date of Patent: Dec. 21, 2004

(54) MULTI-STATION ELECTRICAL DISCHARGE MACHINING WITH MANUFACTURING INTERRUPT REDUCTION

(75) Inventor: Rudi Oskar Krenz, Albuquerque, NM (US)

(73) Assignee: General Electric Corporation, Schenectady, NY (US)

( * ) Notice: Subject to any disclaimer, the term of this patent is extended or adjusted under 35 U.S.C. 154(b) by 175 days.

(21) Appl. No.: 10/286,184

(22) Filed: Nov. 1, 2002

(65) Prior Publication Data

US 2004/0084418 A1 May 6, 2004

(51) Int. Cl.[7] .............................. B23H 1/00; B23H 9/30
(52) U.S. Cl. ...................... 219/69.2; 219/69.11; 408/43
(58) Field of Search .......................... 219/69.11, 69.15, 219/69.2; 408/42, 43, 50; 204/224 M

(56) References Cited

U.S. PATENT DOCUMENTS

| 4,670,635 | A | * | 6/1987 | Johnson et al. .......... 219/69.15 |
| 5,075,530 | A | * | 12/1991 | Lee .......................... 219/69.11 |
| 5,336,025 | A | * | 8/1994 | Ozawa et al. ................. 408/46 |
| 5,920,973 | A | * | 7/1999 | Kosmowski ................. 29/26 A |
| 6,231,279 | B1 | * | 5/2001 | Aufiero .......................... 408/3 |
| 6,326,576 | B1 | * | 12/2001 | Krenz et al. ............. 219/69.11 |
| 6,369,343 | B1 | | 4/2002 | Krenz et al. |
| 6,563,071 | B2 | * | 5/2003 | Krenz ..................... 219/69.13 |

OTHER PUBLICATIONS

U.S. patent application No. 09/401,524, filed Sep. 22, 1999.
U.S. patent application No. 09/888,443, filed May 15, 2001.

* cited by examiner

Primary Examiner—Geoffrey S. Evans
(74) Attorney, Agent, or Firm—Adams Evans P.A.; Rudi Oskar Krenz

(57) ABSTRACT

An electrical discharge machining apparatus is provided with at least two work stations. A first servomotor is mounted above the first and second work stations, and a second servomotor mounted to the first servomotor so as to be selectively positioned over either of the first and second work stations by the first servomotor. The second servomotor is capable of causing relative motion between an electrode and a workpiece fixture in the first work station when positioned over the first work station and causing relative motion between an electrode and a workpiece fixture in the second work station when positioned over the second work station.

14 Claims, 3 Drawing Sheets

MULTI-STATION ELECTRICAL DISCHARGE MACHINING WITH MANUFACTURING INTERRUPT REDUCTION

BACKGROUND OF THE INVENTION

This invention relates generally to electrical discharge machining and more particularly to electrical discharge machining workpieces, such as aircraft engine parts, which have several features machined therein.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece. Although throughput can be improved with this type of apparatus, machining multiple features into a single workpiece is still a relatively slow process.

To further speed production, it has been proposed to use an EDM apparatus that employs multiple electrodes in each work station. Such an EDM apparatus is capable of performing multiple machining operations on a workpiece simultaneously. However, a separate servomotor, power supply and computer numerical control (CNC) is provided for each electrode. The large number of servomotors, power supplies and CNCs increases the complexity and cost of the manufacturing system and requires a lot of floor space in the machining shop. The total number of power supplies and CNCs can be reduced by using a power transfer switch that selectively delivers power to one work station at a time. While reducing the number of power supplies and CNCs, this configuration still utilizes a large number of servomotors. Such EDM apparatuses can be susceptible to manufacturing interrupts.

Accordingly, there is a need for an EDM apparatus that provides multiple machining operations with less EDM equipment than is presently used and is less susceptible to manufacturing interrupts.

SUMMARY OF THE INVENTION

The above-mentioned need is met by the present invention which provides an electrical discharge machining apparatus including at least two work stations. A first servomotor is mounted above the first and second work stations, and a second servomotor mounted to the first servomotor so as to be selectively positioned over either of the first or second work stations by the first servomotor. The second servomotor is capable of causing relative motion between an electrode and a workpiece fixture in the first work station when positioned over the first work station and causing relative motion between an electrode and a workpiece fixture in the second work station when positioned over the second work station.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
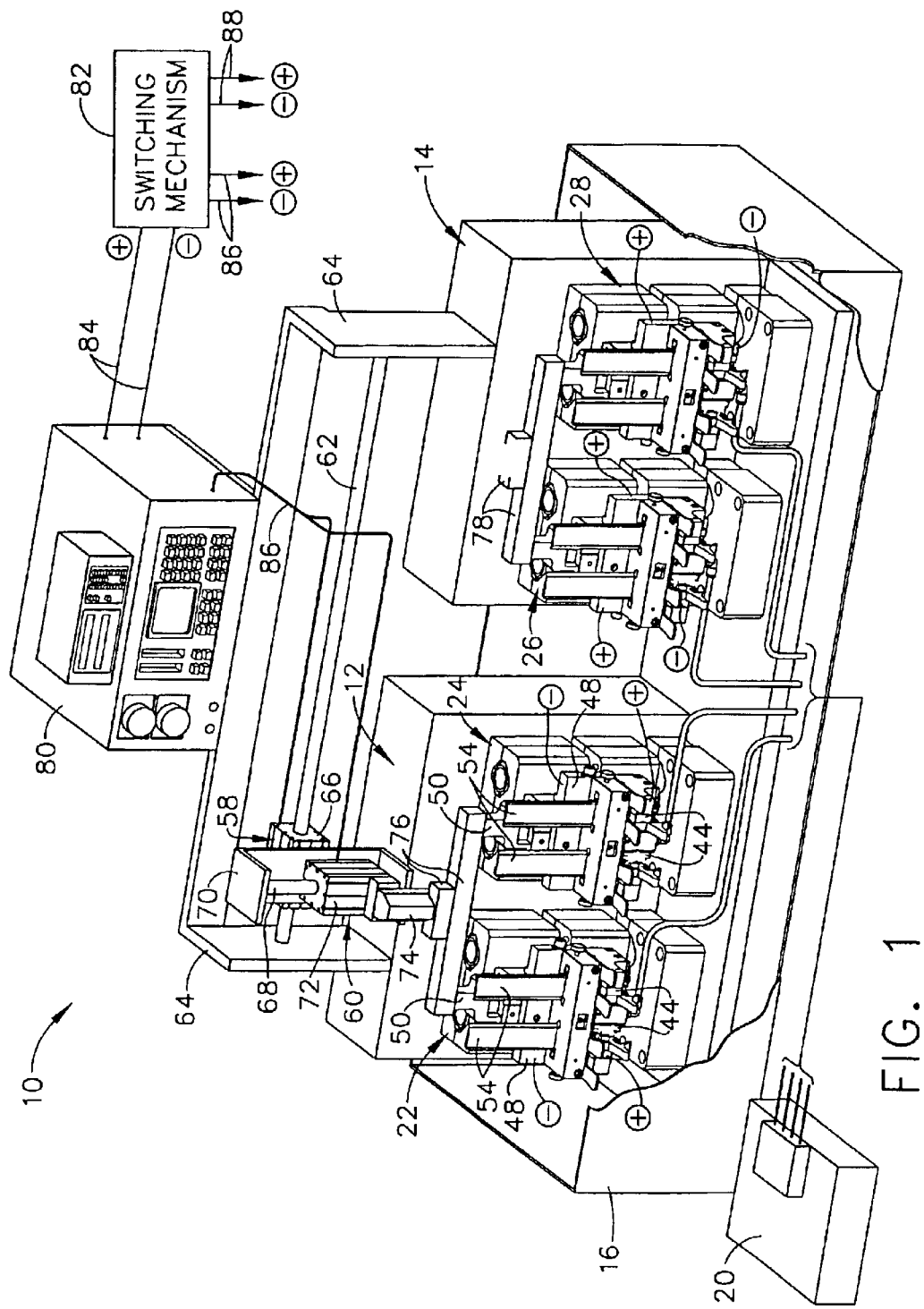
FIG. 1 is a schematic view of an EDM apparatus in a first machining configuration.
Figure 2:
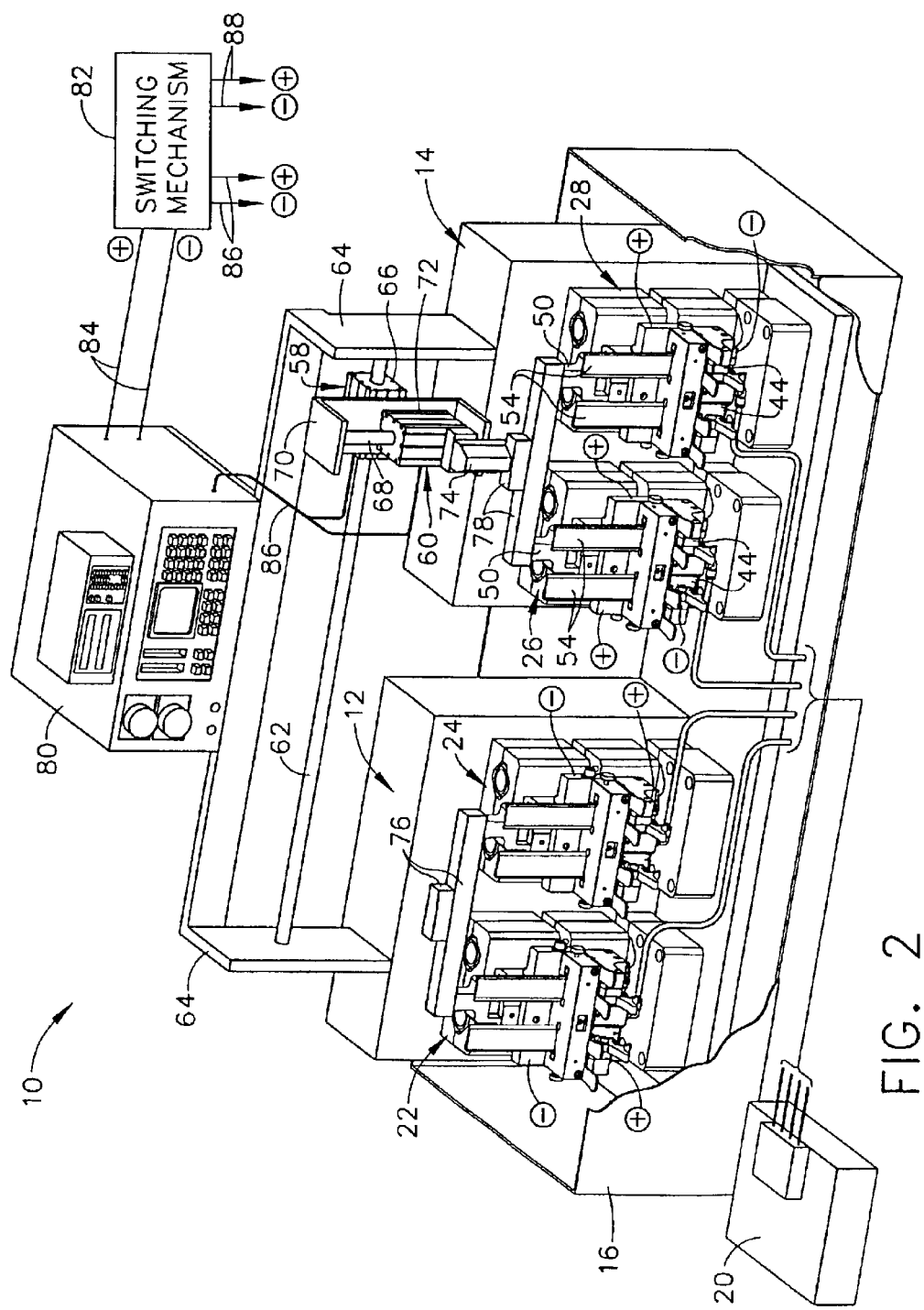
FIG. 2 is a schematic view of the EDM apparatus in a second machining configuration.

Referring to the drawings wherein identical reference numerals denote the same elements throughout the various views, FIGS. 1 and 2 show an electrical discharge machining (EDM) apparatus 10. The EDM apparatus 10 includes first and second work stations 12 and 14 disposed side-by-side in a tank 16, which is shown in partial cut-away to reveal the work stations 12, 14 therein. Although two work stations are shown for purposes of illustration, it should be noted that virtually any number of such stations could be employed in the EDM apparatus 10 of the present invention. As is well known in the field, the tank 16 is filled with a suitable dielectric fluid, such as a dielectric oil, so that the workpieces are immersed in the fluid. The dielectric fluid insulates against premature spark discharge, cools the machined area, and flushes away machining debris. A float switch (not shown) is provided in the tank 16 for detecting when the dielectric fluid reaches a sufficient depth. The float switch is located such that the level of dielectric fluid is just high enough to immerse workpieces installed in the work stations 12, 14. A conventional filtering system 20 is connected to the tank 16 for filtering the dielectric fluid, preferably down to one micron absolute.

Each work station 12, 14 operates independently to machine separate sets of workpieces. More specifically, the first work station 12 includes first and second machining heads 22 and 24, and the second work station 14 includes third and fourth machining heads 26 and 28. As described in more detail below, each machining head machines two workpieces at a time such that each work station can machine four workpieces at a time. It should be noted that two workpieces per machining head and two machining heads per work station are shown for purposes of illustration only. The present invention is not limited to this particular arrangement. Virtually any combination of workpieces per machining head and machining heads per work station is possible, although it is desirable that the number of workpieces machined by a work station during a single operation be divisible the number of parts in a complete set so that extra parts are not produced.

Figure 3:
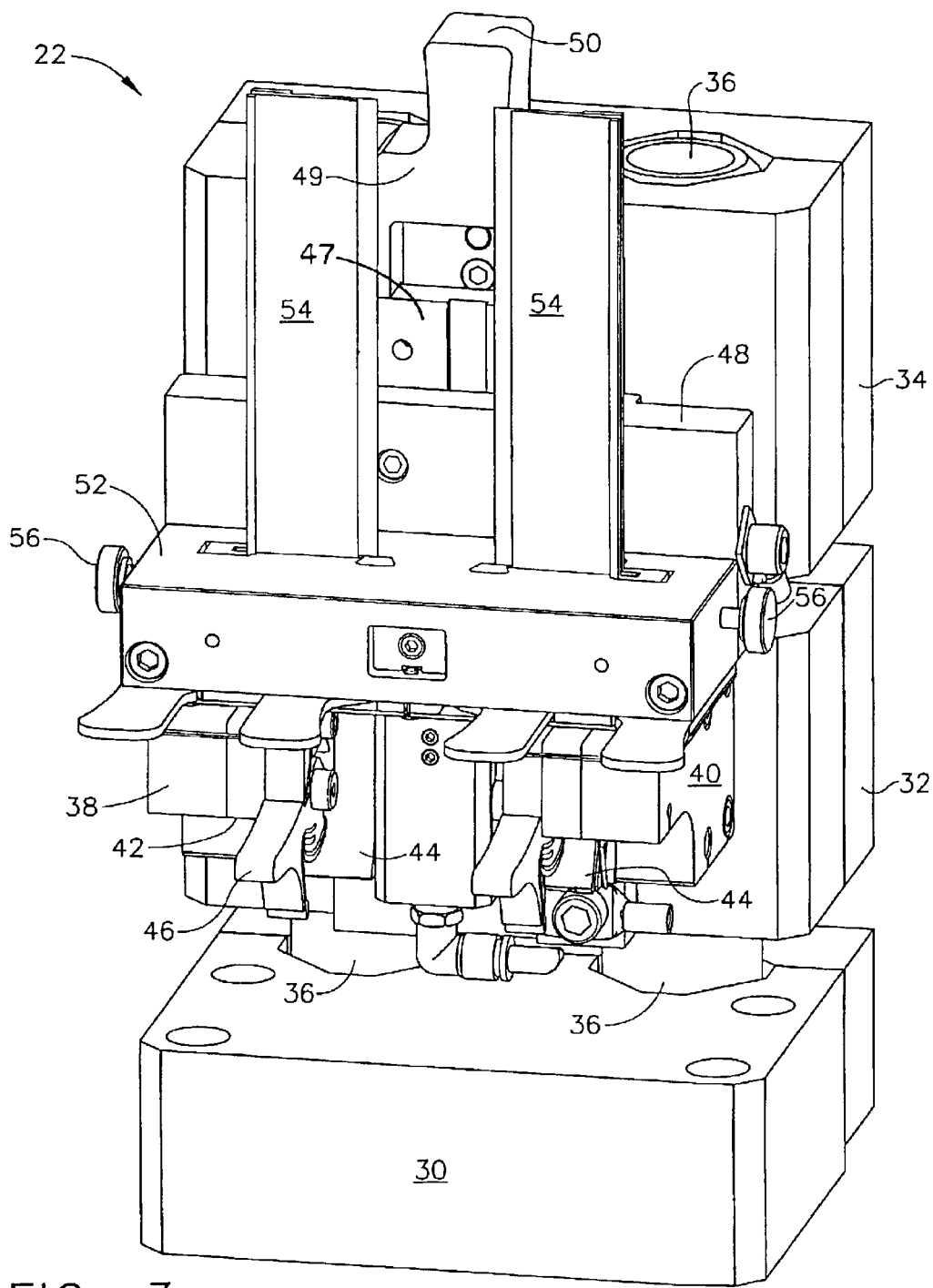
FIG. 3 is a perspective view showing a machining head from the EDM apparatus of FIGS. 1 and 2 in more detail.

Turning to FIG. 3, the first machining head 22 is shown in more detail. The first machining head 22 includes a base 30, a lower support block 32 and an upper support block 34. The lower and upper support blocks 32, 34 are supported on the base 30 by a pair of insulated mounting posts 36, with the upper support block 34 being positioned directly above the lower support block 32.

First and second workpiece fixtures 38 and 40 are mounted side-by-side on the front surface of the lower support block 32. The first workpiece fixture 38 includes a part holder 42 fixedly attached to the lower support block 32. The part holder 42 is configured to receive a workpiece 44 therein. A spring-biased loading clamp 46 is pivotally connected to the part holder 42 for retaining the workpiece 44 in the part holder 42. The loading clamp 46 is pivotable between a closed position engaging the workpiece 44 and an open position not engaging the workpiece 44. When the loading clamp 46 is in its closed position, the workpiece 44 is pressed against the part holder 42 by the spring force and thus held in position. The workpiece 44 can be removed from the part holder 42 when the loading clamp 46 is in its open position. The part holder 42 is limited to one specific workpiece configuration (thereby preventing loading of a wrong workpiece), but the removable mounting of the part holder 42 to the lower support block 32 means it can be readily exchanged with another part holder that accepts a different workpiece configuration. The second workpiece fixture 40 is substantially similar to the first workpiece fixture 38; consequently, a detailed description of the second workpiece fixture 40 will not be repeated here. However, it should be noted that the part holders of the first and second workpiece fixtures 38, 40 do not necessarily have to have the exact same configuration. That is, the two workpiece fixtures can be designed to retain workpieces of different sizes and/or shapes.

The first machining head 22 further includes a slider 47 moveably mounted to the front surface of the upper support block 34. Specifically, the slider 47 is arranged to slide relative to the upper support block 34 in a vertical direction. A carriage 48 is fixedly mounted to the slider 47 for movement therewith. The carriage 48 is a substantially rectangular plate made of an electrically conductive material. An arch 49 having an upwardly extending tab 50 is formed on the upper end of the slider 47. An exchangeable electrode holder 52 is removably mounted to the lower end of the carriage 48. The electrode holder 52 has a pair of electrode receiving slots formed therein. The slots are positioned side-by-side so as to be located directly above a corresponding one of the first and second workpiece fixtures 38 and 40. An electrode 54 is disposed in each slot and secured by respective lock screws 56. The electrodes 54 can be any type of electrode used in electrical discharge machining. The electrode holder 52 can be removed and exchanged with another electrode holder. This provides a simple means of changing electrodes so that the work station can be used for a different machining operation that calls for different electrodes. Back-and-forth vertical motion of the slider 47 (described in detail below) causes the carriage 48, the electrode holder 52 and the electrodes 54 to move in and out of machining engagement with the respective workpieces 44. It should be noted that as an alternative, the workpiece fixtures could be mounted on the carriages and the electrode holders mounted on the fixed base.

The three other machining heads are substantially similar to the above-described first machining head 22. Thus, a detailed description of the other machining heads will not be repeated here. However, it should be noted that while they function in the same manner, all of the machining heads are not necessarily identical. That is, the electrodes of the first and second machining heads 22, 24 could differ in shape, size, material and/or polarity from the electrodes of the third and fourth machining heads 26, 28. Thus, the first and second work stations 12, 14 can machine different features. The first and second work stations 12, 14 can also operate with different EDM parameters (e.g., power and time).

Referring again to FIGS. 1 and 2, the EDM apparatus 10 includes a horizontally-oriented linear servomotor 58 and a vertically-oriented linear servomotor 60. It should be noted that while linear servomotors are shown to facilitate disclosure of the present invention, rotary servomotors could alternatively be used. However, linear servomotors are generally preferred because of their better speed, faster frequency response and positional accuracy. The horizontal servomotor 58 includes a linear motor stator rod 62 supported above the first and second work stations 12, 14 by a frame 64. The stator rod 62 is oriented horizontally and spans both work stations 12, 14. A linear motor slider 66 is slidingly mounted on the stator rod 62. The vertical servomotor 60 includes a linear motor stator rod 68 mounted in a yoke 70 that is attached to the horizontal slider 66 for movement therewith. The yoke 70 is oriented so that the stator rod 68 extends vertically, perpendicular to the horizontal stator rod 62. A linear motor slider 72 is slidingly mounted on the vertical stator rod 68. An actuator bar 74 is attached to the front surface of the vertical slider 72 and extends downward therefrom.

When the horizontal servomotor 58 is energized, the horizontal slider 66 is caused to move linearly with respect to the horizontal stator rod 62. The vertical servomotor 60 moves laterally with the horizontal slider 66. Thus, the vertical servomotor 60 can be positioned directly over the first work station 12 as shown in FIG. 1 or directly over the second work station 14 as shown in FIG. 2.

The first work station 12 has a first contact block 76 that extends between and is attached to the slider tabs 50 of the first and second machining heads 22 and 24. Similarly, the second work station 14 has a second contact block 78 that extends between and is attached to the slider tabs 50 of the third and fourth machining heads 26 and 28.

When the vertical servomotor 60 is energized while positioned directly over the first work station 12 as shown in FIG. 1, the vertical slider 72 is caused to move linearly with respect to the vertical stator rod 68. Downward movement of the vertical slider 72 causes the actuator bar 74 to move into engagement with the first contact block 76. Further downward movement of the vertical slider 72 is transmitted by the actuator bar 74, the first contact block 76 and the respective sliders 47 so as to cause the carriages 48 of both the first and second machining heads 22, 24 move downward. This in turn causes the electrodes 54 to move into machining engagement with the corresponding workpiece 44. The sliders 47 are normally biased upward by a compression spring (not shown) disposed in each arch 49. When the vertical servomotor 60 is energized to move the vertical slider 72 (and actuator bar 74) upward, the compression springs cause the sliders 47 and the first contact bar 76 to move upward, thereby retracting the carriage 48, electrode holder 52 and electrodes 54. The compression spring forces are balanced to the weight of the entire slider mechanism so that the vertical servomotor 60 is very lightly loaded.

When the vertical servomotor 60 is energized while positioned directly over the second work station 14 as shown in FIG. 2, the vertical slider 72 is caused to move linearly with respect to the vertical stator rod 68. Downward movement of the vertical slider 72 causes the actuator bar 74 to move into engagement with the second contact block 78. Further downward movement of the vertical slider 72 is transmitted by the actuator bar 74, the second contact block 78 and the respective sliders 47 so as to cause the carriages 48 of both the third and fourth machining heads 26, 28 move downward. This in turn causes the electrodes 54 to move into machining engagement with the corresponding workpiece 44. Upward movement of the vertical slider 72 permits compression springs in the arches 49 to force the sliders 47 upward, thereby retracting the electrodes 54.

The EDM apparatus 10 also includes a standard EDM control system 80. As is known in the field, the EDM control system 80 includes a power supply or spark generator and a controller, such as a computer numerical control (CNC). The power supply selectively provides energy to one of the first and second work stations 12, 14 via a switching mechanism 82 that is connected to the EDM control system 80 by a set of input power cables 84. The switching mechanism 82 (shown schematically in FIGS. 1 and 2) is a simple electromechanical mechanism that is capable of switching power between the first and second work stations 12, 14. When the switching mechanism 82 is in a first state, power from the EDM control system 80 is delivered to the first work station 12 via a first set of output power cables 86, and when the switching mechanism 82 is in a second state, power from the EDM control system 80 is delivered to the second work station 14 via a second set of output power cables 88. The first and second sets of output power cables 86, 88 are connected to the part holders 42 and the carriages 48 of the first and second work stations 12, 14, respectively. Thus, electrical energy is delivered to the workpieces 44 of the selected work station through the electrically conductive part holders 42 and to the electrodes 54 of the selected work station through the electrically conductive carriages 48 and electrode holders 52. The controller of the EDM control system 80 is connected to the vertical servomotor 60 via servo cables 90, which travel with the vertical servomotor 60.

In operation, the first work station 12 alternates with the second work station 14 depending on the state of the switching mechanism 82. While one of the work stations is operating, the other work station is being prepared for the next operation. For example, with new workpieces 44 loaded in the workpiece fixtures 38, 40 of the first and second machining heads 22, 24, the horizontal servomotor 58 is operated to position the vertical servomotor 60 over the first work station 12, as shown in FIG. 1. The switching mechanism 82 is placed in its first state so that EDM power is supplied to the first work station 12. The vertical servomotor 60 is energized so that the electrodes 54 are advanced under the control of the EDM control system 80 toward the corresponding workpieces 44 via coordinated downward motion of the vertical slider 72, the actuator bar 74, the first contact block 76, the respective sliders 47 and the respective carriages 48. The electrodes 54 and workpieces 44 are energized by the power supply in the EDM control system 80 for providing electrical energy to produce electrical discharges or sparks between the electrodes 54 and the workpieces 44 when the electrodes 54 are positioned adjacent to the corresponding workpiece 44. As the sparks vaporize the workpiece material, the vertical servomotor 60 continues to advance the electrodes 54 as dictated by the EDM control system 80 until machining of the desired features is finished. When the machining operation is completed, the vertical servomotor 60 retracts the actuator bar 74, allowing the electrodes 54 to retract.

While the first work station 12 is operating, an operator loads new workpieces 44 into the third and fourth machining heads 26, 28 of the second work station 14. Upon the completion of machining by the first work station 12, the horizontal servomotor 58 is operated to position the vertical servomotor 60 over the second work station 14, as shown in FIG. 2. The switching mechanism 82 is switched to its second state so that EDM power is supplied to the second work station 14. The vertical servomotor 60 is energized so that the electrodes 54 are advanced under the control of the EDM control system 80 toward the corresponding workpieces 44 via coordinated downward motion of the vertical slider 72, the actuator bar 74, the second contact block 78, the respective sliders 47 and the respective carriages 48. The electrodes 54 and workpieces 44 are energized by the power supply in the EDM control system 80 for providing electrical energy to produce electrical discharges or sparks between the electrodes 54 and the workpieces 44 when the electrodes 54 are positioned adjacent to the corresponding workpiece 44. As the sparks vaporize the workpiece material, the vertical servomotor 60 continues to advance the electrodes 54 as dictated by the EDM control system 80 until machining of the desired features is finished. While the second work station 14 is operating, the first work station 12 is being prepared for the next operation. This alternating work cycle repeats continuously.

With this arrangement, the work stations 12, 14 operate independently because only one of the work stations is connected to the EDM control system 80 at a time. Thus, the work stations 12, 14 can perform different operations; that is, each station can work on a different type of part and/or machine a different feature. More specifically, the work stations can have different types of electrodes (e.g., one station can have a graphite electrode, while other station may use brass, copper or copper tungsten electrodes) and use different electrode polarities. For example, in FIGS. 1 and 2, the first work station 12 has graphite electrodes with negative polarity that are sized to machine wide slots in the workpieces. The second work station has copper tungsten electrodes with positive polarity. The electrodes in the third machining head 26 are sized to machine notches, and the electrodes in the fourth machining head 28 are sized to machine holes. In addition, it is possible to have the first and second work stations 12, 14 machining different types of workpieces. In this case, the switching mechanism 82 could switch to different burn parameters as the power is being switched.

The foregoing has described an EDM apparatus that more efficiently machines workpieces, particularly aircraft engine parts, having multiple features. While specific embodiments of the present invention have been described, it will be apparent to those skilled in the art that various modifications thereto can be made without departing from the spirit and scope of the invention as defined in the appended claims.

What is claimed is:

1. An electrical discharge machining apparatus comprising:

first and second work stations;

a first servomotor mounted above said first and second work stations; and a second servomotor mounted to said first servomotor so as to be selectively positioned over either of said first and second work stations by said first servomotor.

2. The electrical discharge machining apparatus of claim 1 wherein said first servomotor is a linear servomotor having a first stator bar supported above said first and second work stations and a first slider mounted on said first stator bar.

3. The electrical discharge machining apparatus of claim 2 wherein said second servomotor is a linear servomotor having a second stator bar mounted to said first slider and a second slider mounted on said second stator bar.

4. The electrical discharge machining apparatus of claim 3 wherein said first and second stator bars are disposed perpendicularly to one another.

5. The electrical discharge machining apparatus of claim 1 wherein said first and second work stations each comprise a plurality of machining heads, each machining head including a base, an electrode holder mounted to said base, and a workpiece fixture mounted to said base, at least one of said electrode holder and said workpiece fixture being movable relative to said base so as to permit relative motion therebetween.

6. The electrical discharge machining apparatus of claim 5 wherein said second servomotor causes relative motion between corresponding electrode holders and workpiece fixtures in said first work station when positioned over said first work station and said second servomotor causes relative motion between corresponding electrode holders and workpiece fixtures in said second work station when positioned over said second work station.

7. The electrical discharge machining apparatus of claim 1 further comprising a power supply and a switching mechanism having a first state in which said power supply is connected to said first work station and a second state in which said power supply is connected to said second work station.

8. An electrical discharge machining apparatus comprising:
   a first work station having a first electrode and a first workpiece fixture;
   a second work station having a second electrode and a second workpiece fixture;
   a first servomotor mounted above said first and second work stations; and
   a second servomotor mounted to said first servomotor so as to be selectively positioned over either of said first and second work stations by said first servomotor, said second servomotor being capable of causing relative motion between said first electrode and said first workpiece fixture when positioned over said first work station and causing relative motion between said second electrode and said second workpiece fixture when positioned over said second work station.

9. The electrical discharge machining apparatus of claim 8 wherein said first servomotor is a linear servomotor having a first stator bar supported above said first and second work stations and a first slider mounted on said first stator bar.

10. The electrical discharge machining apparatus of claim 9 wherein said second servomotor is a linear servomotor having a second stator bar mounted to said first slider and a second slider mounted on said second stator bar.

11. The electrical discharge machining apparatus of claim 10 wherein said first and second stator bars are disposed perpendicularly to one another.

12. The electrical discharge machining apparatus of claim 8 wherein said first and second work stations each comprise a plurality of machining heads, each one of said machining heads comprising:
   a base;
   a carriage slidingly mounted to said base; and
   a workpiece fixture and an electrode holder, one of said workpiece fixture and an electrode holder being mounted to said carriage so as to permit relative motion therebetween.

13. The electrical discharge machining apparatus of claim 12 wherein said first work station has a first contact block attached to said carriages of said first work station and said second work station has a second contact block attached to said carriages of said second work station, said second servomotor including an actuator bar that engages said first contact block when said second servomotor is positioned over said first work station and engages said second contact block when said second servomotor is positioned over said second work station.

14. The electrical discharge machining apparatus of claim 8 further comprising a power supply and a switching mechanism having a first state in which said power supply is connected to said first work station and a second state in which said power supply is connected to said second work station.

* * * * *